United States Patent
Laird-McConnell

(12) United States Patent (10) Patent No.: US 7,861,297 B2
Laird-McConnell (45) Date of Patent: Dec. 28, 2010

(54) REDUCING SECURITY THREATS FROM UNTRUSTED CODE

(75) Inventor: Thomas M Laird-McConnell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1079 days.

(21) Appl. No.: 11/239,164

(22) Filed: Sep. 30, 2005

(65) Prior Publication Data

US 2007/0079371 A1 Apr. 5, 2007

(51) Int. Cl.
*G06F 21/00* (2006.01)

(52) U.S. Cl. .............. 726/22; 726/23; 726/24; 726/25

(58) Field of Classification Search ............ 726/1–26; 709/202

See application file for complete search history.

(56) References Cited

U.S. PATENT DOCUMENTS

| | | | | |
|---|---|---|---|---|
| 6,138,238 A * | 10/2000 | Scheifler et al. | ............... | 726/17 |
| 6,289,462 B1 * | 9/2001 | McNabb et al. | ............... | 726/21 |
| 6,321,334 B1 * | 11/2001 | Jerger et al. | .................... | 726/1 |
| 2002/0120673 A1 * | 8/2002 | Tolson et al. | ................ | 709/202 |
| 2005/0235340 A1 * | 10/2005 | To | ................................ | 726/3 |
| 2006/0036570 A1 * | 2/2006 | Schaefer et al. | ................ | 707/1 |
| 2006/0037084 A1 * | 2/2006 | Brown et al. | .................. | 726/28 |

* cited by examiner

*Primary Examiner*—Nasser Moazzami
*Assistant Examiner*—Ghazal Shehni
(74) *Attorney, Agent, or Firm*—Shook, Hardy & Bacon L.L.P.

(57) ABSTRACT

The invention introduces a system and method for reducing security threats from untrusted code. The invention can be configured to generate counterfeit component files for every component that is not approved for a particular application. If the untrusted code requests to have the application load a component that the application is not approved to load, the application can load the counterfeit component file that corresponds to the requested component.

18 Claims, 3 Drawing Sheets

REDUCING SECURITY THREATS FROM UNTRUSTED CODE

CROSS-REFERENCE TO RELATED APPLICATION

Not Applicable.

STATEMENT REGARDING FEDERALLY SPONSORED RESEARCH OR DEVELOPMENT

Not Applicable.

BACKGROUND

Sometimes an application may need to execute code, a third party plug-in for example, which is provided by a source that may be untrusted. When the application calls into this untrusted code the application may expose itself to possible security threats. There can be a higher degree of risk if there happens to be a flaw in the application that can allow the injection of malicious code into a process. An example of this can happen with the interaction between an indexing service and an applications designed to pull the text out of a specific file format so that an indexer can consume it. A document could be sent to a user as an attachment in an email that may require the application to extract textual information from the document. A flaw in the application may exist that when the application is invoked on the attachment to extract the textual information from a document, the attachment, if malicious, may cause a buffer overflow or other form of code injection that, in theory, can call any function in any well-known component on the system.

There may be some options in trying to solve this problem. The application can be made to run under a restricted user token. This can cause the application to not be able to delete files, execute files, modify the registry etc. However, this may not be enough. Some parts of the operating system may still be vulnerable to an attack even with a reduction in permissions. An example of this is that currently the operating system does not allow you to prevent access from network application program interfaces (APIs). If the security threat came from the network, preventing access to resources on the network may be critical, as a compromised program could otherwise start downloading additional malicious code to compromise the entire system.

SUMMARY

The invention discloses a system and method for reducing security threats from untrusted code. The invention can be configured to analyze an import table of an application to determine what components are needed by the application in order for it to complete a task. The invention can receive a request for a component, and if the requested component is not an approved component outlined in the import table, a separate data file can be generated that can correspond to the requested component. Once the data file has been generated, the generated file can be executed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
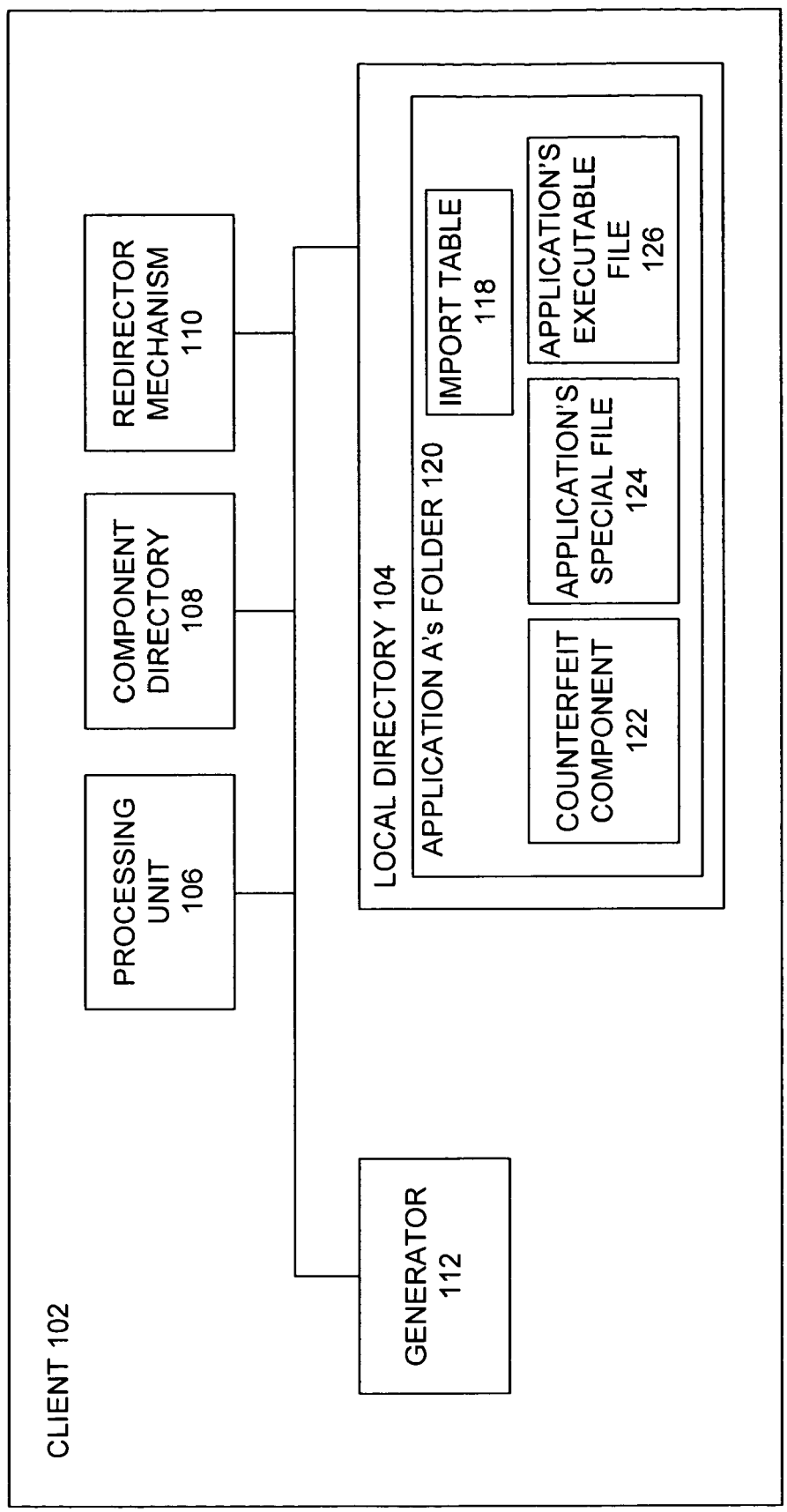
FIG. 1 illustrates an embodiment of a system for implementing the invention.

The invention introduces a system and method for reducing security threats from untrusted code. The invention discloses a redirecting mechanism that can be utilized to disable parts of an operating system from an application running the untrusted code. The invention can be utilized to analyze the needs of the application to determine which parts of the operating system should be disabled. The needs of the application can be determined by evaluating an import table that can contain a list of components needed by the application in order for the application to complete a task. The list of components from the import table can be compared with an all-inclusive list, such as a listing for a directory containing all available components. The components can be, for example, Dynamic Link Libraries (DLLs) that can be used by various applications. After the comparison, a counterfeit component, that can disable some or all functionality of a component, can be generated for every component that is found only in the component directory. Alternatively, a counterfeit component can be generated for a subset of all components found only in the component directory. Each counterfeit component can have the same identifier as the component that the counterfeit component corresponds to. A special file can also be generated for the application's executable file. The special file can be a file that can inform an operating system to defer to components found in the local directory the special file is located. The special file and the counterfeit component can be stored in the same local directory as the application's executable file. So, if an application is running some untrusted code that wants the application to load a component that the application is not approved to load as stated in the import table, the redirection mechanism can redirect an application's request for the component to the local directory and can provide the application a counterfeit component corresponding to the component that the application is not approved to receive.

An example of a redirection mechanism that can be utilized by the invention is a DLL/COM redirection mechanism. A DLL/COM redirection mechanism can use an application isolation strategy employed by administrators on an operating system. A DLL/COM redirection mechanism can bind an application to a local version of a component. The local component's files can be kept separate from the system's version of the component in a location that can be private to the application. The system's version of the component can be globally registered and available to any other application that binds to it. The local version of the component can be reserved for the exclusive use of the application.

A DLL/COM redirection mechanism can be activated by installing a special file along with a copy of the local component into the same directory as the application's executable file. The special file can be an empty file named after the application executable's file name. In embodiment, the special file can be appended with local. When a special file is stored with an application's executable file in a local directory, the special file can be utilized to inform an operating system to defer to components found in the local directory with the special file and the executable file regardless of any path given. For example, to activate a DLL/COM redirection mechanism for an application named Myapp, the local version of the component and an special file named Myapp.exe.local can be copied into the folder containing Myapp.exe. This can bind the application to the local version of the component rather than the globally shared version of the component.

In an embodiment, when an application loads a component, such as a DLL or .ocx file, the operating system can first search for the component in the local folder where the application's special file and executable file is installed. If the component is found in the local folder, the application can use the local component regardless of any directory search path defined in the application or the registry. If the component is not found, the component in the defined search path can be used.

FIG. 1 is an embodiment of a system for implementing the invention. Client 102 may be or include a desktop or laptop computer, a network-enabled cellular telephone, wireless email client, or other client, machine or device to perform various tasks including Web browsing, search, electronic mail (email) and other tasks, applications and functions. Client 102 may be or can include a server including, for instance, a workstation running the Microsoft Windows®, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform. Client 102 may additionally include portable media devices such as digital still camera devices, digital video cameras, media players such as personal music players and personal video players, and other portable media devices.

Client 102 can include a communication interface. The communication interface may be an interface that can allow the client to be directly connected to another client or device or allows the client 102 to be connected to another client or device over a network. The network can include, for example, a local area network (LAN), a wide area network (WAN), or the Internet. In an embodiment, the client 102 can be connected to another client or device via a wireless interface.

Client 102 can include a plurality of elements. Such elements can include a local directory 104, a processing unit 106, a component directory 108, a redirection mechanism 110, a generator 112. The local directory can include a listing of applications found within client 102. Application A is an example of an application found within client 102. The local directory 104 can be a directory that can store information regarding each application The information can be stored, for example, in a folder 120 for each application. The folder can include information such as all counterfeit component 122 for the application, the application's special file 124, and the application's executable file 126. An application folder can also include an import table 118. The import table 118 can include a listing of all components needed by application 116 in order for the application to complete its job. The import table 118 can be built into the application and can include a plurality of automatic references to APIs that can inform the processing unit 106 which components is needed by the application. Processing unit 106 can have various functions, one of which can be to analyze the import table to determine which components are needed by the application from the component directory 108 and which components from the component directory 108 are not needed by the application.

The component directory can include a list of all components found within client 102. The components can be, for example, DLL files.

Redirection mechanism 110 can be utilized to redirect requests from an application for a component to the local directory 114. The redirection mechanisms can be utilized to disable parts of an operating system from an application running untrusted code. The redirection mechanism 110 can be configured to always redirect requests from applications for components to the local directory 114 first. The redirection mechanism can be a DLL/COM redirection mechanism as discussed above.

Generator 112 can be utilized to generate special files and counterfeit components. A special file can be an empty file that can be named after the application executable's file name. The special file can be used to inform an operating system to defer to components found in the local directory the special file is located. In an embodiment, the special file can be appended with local. The counterfeit component can be a data file corresponding to a component found in component directory 108, however, the counterfeit component can have no executable instructions. The counterfeit component can also have the same identifier as a corresponding component found in the component directory 108. The identifier can be, for example, the name of the component.

Figure 2A:
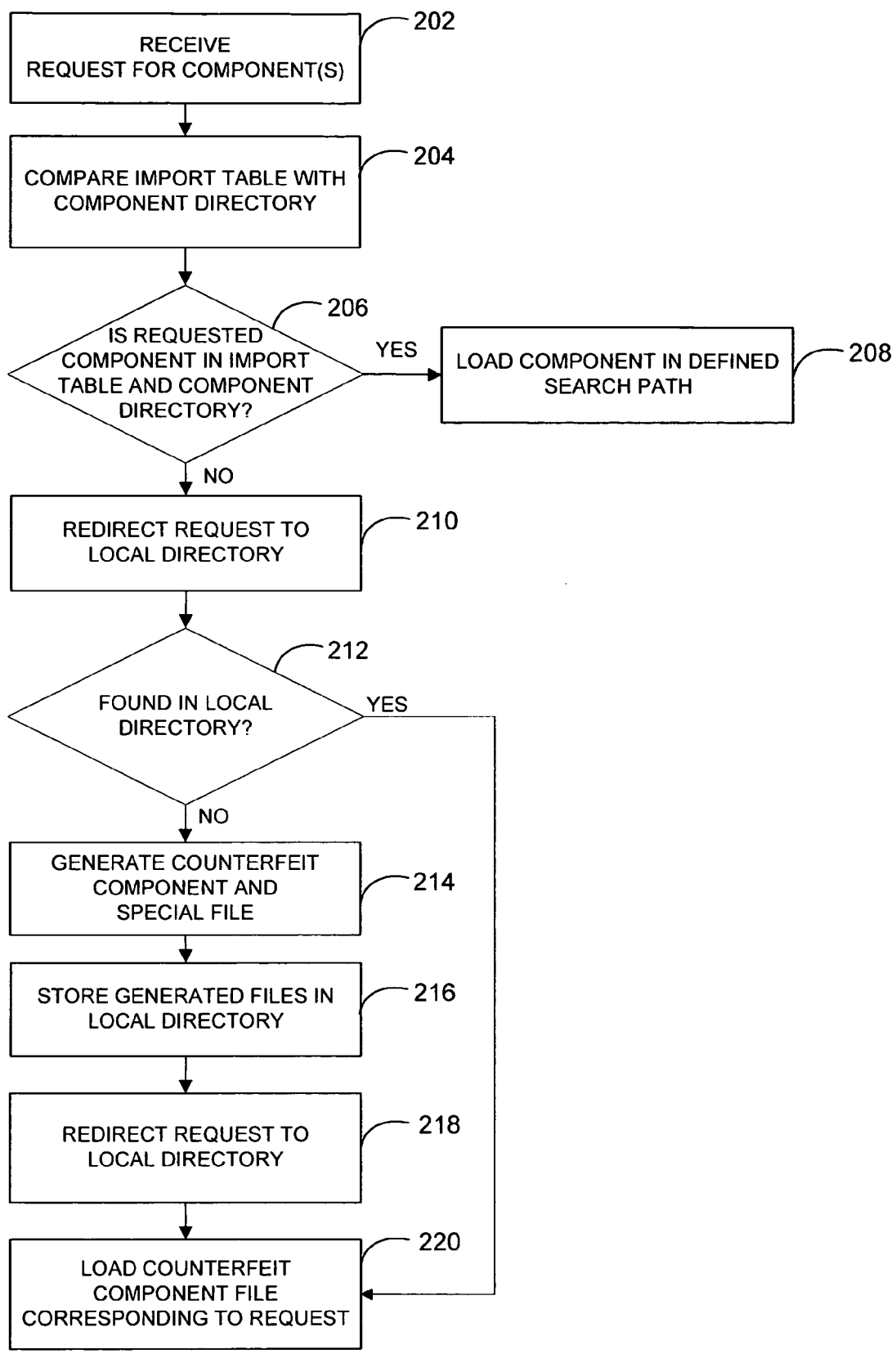
FIG. 2A illustrates an embodiment that can include generating counterfeit components and special files on-the-fly as requests for components are made by applications.
Figure 2B:
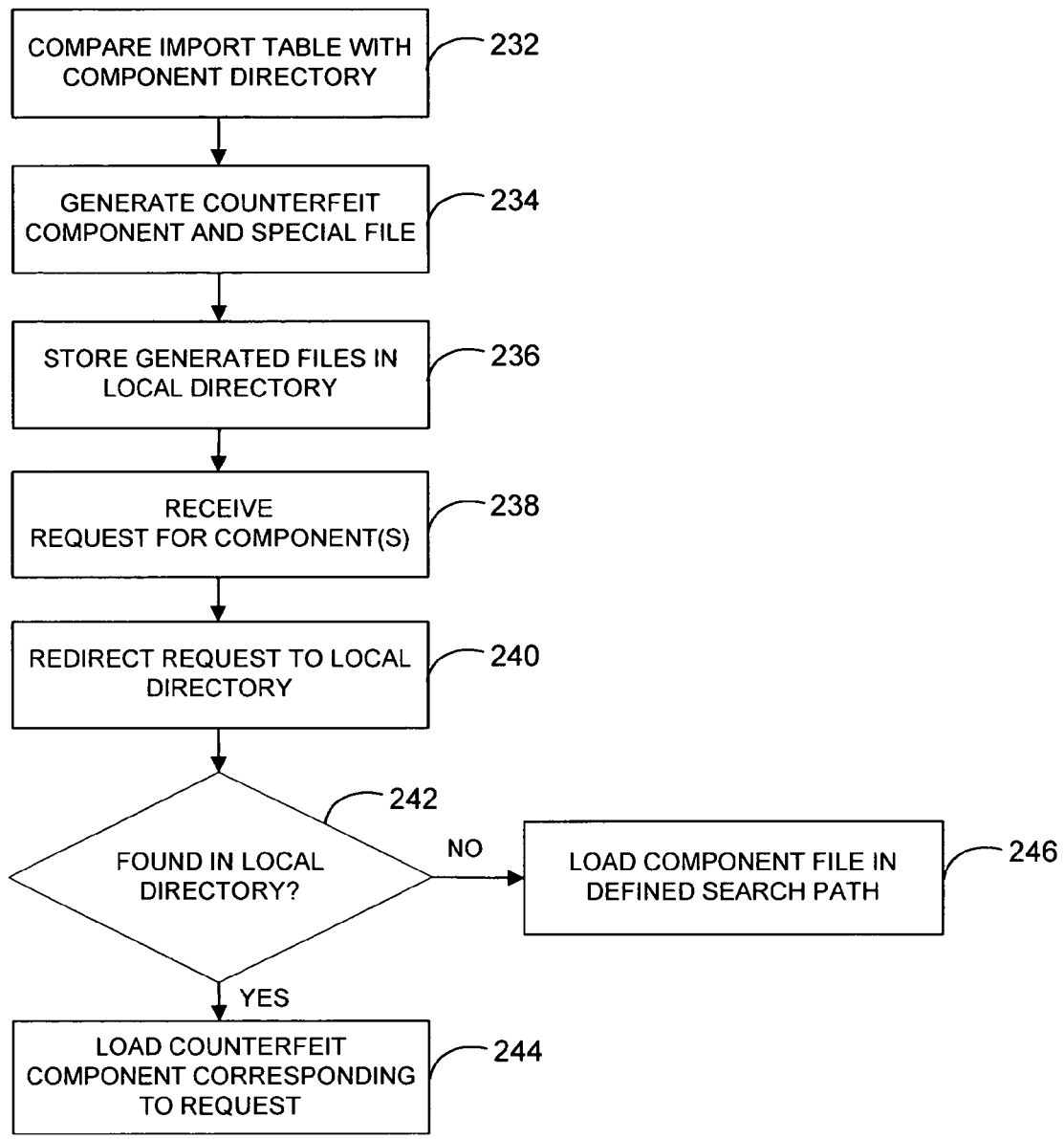
FIG. 2B illustrates an embodiment that can include generating counterfeit components and special files before a request for a component is made by an application.

FIGS. 2A and 2B are block diagrams of an embodiments for reducing security threats from untrusted code. FIG. 2A is an embodiment that can include generating counterfeit components and special files on-the-fly as requests for components are made by applications. In FIG. 2A, a request for a component can be made by an application at step 202. A processing unit of the client can be utilized to analyze an import table of the application. Again, the import table can include a listing of components needed by the application in order for the application to complete a task. The processing unit can then compare the import table with the component directory at step 204 to determine which components from the directory the application should be given access to. At step 206, after the comparison, the processing unit can determine whether the requested component is present within the import table and the component directory. If the requested component is found within both the import table and the directory, then the requested component can be loaded in the defined search path at step 208. However, if the requested component is not found within both the import table and the component directory, then, at step 210, the redirection mechanism can redirect the request to the local directory to determine whether a counterfeit component that corresponds to the requested component already exists. At step 212, if it is determined that a corresponding counterfeit component is already present within the local directory, then the counterfeit component can be loaded at step 220. However, if a corresponding counterfeit component is not already present, then a counterfeit components and special files can be generated at step 214.

At step 214, a counterfeit component can be generated for every component found only in the component directory based on the comparison of the import table and the component directory in step 204. Alternatively, a counterfeit file can be generated for a subset of components found only in the component directory. In any case, each counterfeit component generated can correspond to a component that is found only in the component directory. In an embodiment, the counterfeit components can be generated manually by a user. In generating counterfeit components manually, the invention can be configured to allow a user to specify for which components, that are only found in the component directory, corresponding counterfeit components should be generated.

In such an embodiment, the user can manually select counterfeit components to be generated for all components found only in the component directory, or the user can select to have counterfeit components generated for a subset of components found only in the component directory.

In another embodiment, the invention can be configured to automatically generate the counterfeit components. Software code can be installed on the client to automatically generate counterfeit components for every request from an application that is received. The software code can automatically commence a process of the processing unit analyzing the import table of an application and the component directory whenever a request from an application is received, and can automatically begin the generation of counterfeit components based on the processing unit's determination. The software code can be configured to automatically generated counterfeit components for all components found only in the component directory after a comparison by the processing unit, or counterfeit components can be automatically generated for a subset of components found only in the component directory. A special file can also be generated at step 214, wherein a special file can be an empty file named after the application executable's file name. The special file can be used to inform an operating system to defer to components found in the local directory the special file is located. In an embodiment, the special file can be appended with local.

At step 216, the generated counterfeit component and the special file can be stored at a local directory in the same folder as the application's executable file. At step 218, a redirector mechanism can redirect the request to the local directory where the counterfeit component that corresponds to the requested component is found. At step 220, the counterfeit component that corresponds to the requested component can be loaded by the application.

FIG. 2B is an embodiment that can include generating counterfeit components and special files before a request for a component is made by an application. An application's import table can be included within the application when the application is first installed on a client, and therefore, can be reviewed and analyzed at any time by a processing unit before a request for a component is ever made by an application. Therefore, counterfeit components and special files can be generated before a request is made by an application for a component. At step 232, a processing unit can compare the application's import table with the component directory to determine which components from the directory the application should be given access to. A counterfeit component can be generated for every component not found in both the import table and the component directory at step 234. Alternatively, a counterfeit file can be generated for a subset of components found only in the component directory. In any case, each counterfeit component generated can correspond to a component that is found only in the component directory. The counterfeit components can be generated manually or automatically in the same manner as discussed above with reference to FIG. 2B. A special file can also be generated at step 234.

At step 236, the generated counterfeit component and the special file can be stored at a local directory in the same folder as the application's executable file. At step 238, a request from a application for a component can be made by an application. The redirection mechanism can be utilized to redirect the request and all other requests to the local directory first to find the requested component at step 240. At step 242, a determination can be made to determine whether a counterfeit component corresponding to the requested component is found within the local directory. If a counterfeit file corresponding to the requested component is found in the local directory, then the counterfeit file can be loaded by the application at step 244. However, if a counterfeit file corresponding to the requested component is not found in the directory, the component in the defined search path can be used at step 246.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

I claim:

1. A computer-implemented method for reducing security threats from untrusted code, comprising:

providing a first component list that includes a listing for a directory containing all available components of an operating system and a second component list, the second component list being a subset of the first component list wherein the second component list contains a set of components required for an application to complete a task;

receiving from the application a request for a global component, wherein the component is a member of the first component list but not a member of the second component list;

generating a dummy file, wherein the dummy file is an empty file named after an executable portion of the requested global component;

utilizing the dummy file to instruct the operating system to defer to components found in a local directory in response to the application request;

generating a plurality of counterfeit components for every component found only in the second component list based on a comparison of the request for the global component and the second component list wherein the plurality of counterfeit components includes a local counterfeit version of the global component for the requested component wherein the counterfeit version redirects the application request for the global component to a local directory and disables at least one item of functionality of the requested global component and wherein the local counterfeit version of the global component allows access of the application to components on the second component list but prevents the application from making unauthorized changes to other components of an operating system; and executing, utilizing one or more computing device, the generated local counterfeit version to provide the application a local counterfeit version of the global component.

2. The computer-implemented method according to claim 1, further comprising receiving the request for the component from an application stored in a directory, and storing the generated local counterfeit version of the global component in the directory.

3. The computer-implemented method according to claim 1, further comprising generating the local counterfeit version of the global component automatically.

4. The computer-implemented method according to claim 1, wherein the local counterfeit version of the global component is generated and subsequently stored in a directory before the request is received.

5. The computer-implemented method according to claim 4, further comprising initially redirecting the request first to the directory when the request is received.

6. The computer-implemented method according to claim 5, wherein the directory includes a special file to signify that the request is to be redirected to the directory.

7. The computer-implemented method according to claim 1, wherein the local counterfeit version of the global component redirects the application request for the component utilizing a DLL/COM Redirection mechanism.

8. A computer-implemented method for executing a component, comprising:
    receiving a first request from an application for a global component stored in a first directory, the global component having an identifier;
    comparing the requested global component with a list of components associated with the application, the list of components identifying a set of components required for the application to complete a task;
    generating a dummy file, wherein the dummy file is an empty file named after an executable portion of the requested global component;
    utilizing the dummy file to instruct the operating system to defer to components found in a local directory in response to the application request;
    generating utilizing one or more computing device, a plurality of counterfeit components for every component found only in the second component list based on a comparison of the request for the global component and the second component list wherein the plurality of counterfeit components includes a local counterfeit version of the global component corresponding to the requested global component, the local counterfeit version of the global component having the same identifier as the requested global component, wherein the local counterfeit version of the global component redirects the application request for the global component to the local directory and disables at least one item of functionality of the requested global component and wherein the local counterfeit version of the global component limits access of the application to the list of components required for the application to complete a task but prevents the application from making unauthorized changes to other components of an operating system;
    storing the generated local counterfeit version of the global component in a second directory;
    redirecting the a second request for a global component the application is not approved to receive the second request having a similar identifier to the first request, to the generated local counterfeit version of the global component in the second directory;
    generating the local counterfeit version of the global component before the request is received.

9. The computer-implemented method according to claim 8, wherein the request is redirected by a DLL/COM Redirection mechanism.

10. The computer-implemented method according to claim 8, further comprising generating the local counterfeit version of the global component automatically.

11. The computer-implemented method according to claim 8, further comprising initially redirecting the request first to the second directory when the request is received.

12. One or more computer readable media with storing instructions for executing a method for reducing security threats from untrusted code, the method comprising:
    providing a first component list that includes a listing for a directory containing all available components of an operating system and a second component list, the second component list being a subset of the first component list wherein the second component list contains a set of components required for an application to complete a task;
    receiving a request for a global component, wherein the component is a member of the first component list but not a member of the second component list;
    generating a dummy file, wherein the dummy file is an empty file named after an executable portion of the requested global component;
    utilizing the dummy file to instruct the operating system to defer to components found in a local directory in response to the application request;
    generating a plurality of counterfeit components for every component found only in the second component list based on a comparison of the request for the global component and the second component list wherein the plurality of counterfeit components includes a local counterfeit version of the global component for the requested global component wherein the local counterfeit version of the global component redirects the application request for the component to the local directory and disables at least one item of functionality of the requested global component and wherein the local counterfeit version of the global component allows access of the application to components on the second component list but prevents the application from making unauthorized changes to other components of an operating system; and
    executing, utilizing one or more computing device, the generated local counterfeit version of the global component to provide the application a local counterfeit version of the global component.

13. The computer readable media according to claim 12, further comprising receiving the request for the global component from an application stored in a directory, and storing the generated local counterfeit version of the global component in the directory.

14. The computer readable media according to claim 13, further comprising utilizing a redirection mechanism to redirect the request to the generated local counterfeit version of the global component in the directory.

15. The computer readable media according to claim 12, further comprising generating the local counterfeit version of the global component automatically.

16. The computer readable media according to claim 12, wherein the local counterfeit version of the global component generated and subsequently stored in a directory before the request is received.

17. The computer readable media according to claim 16, further comprising initially redirecting the request first to the directory when the request is received.

18. The computer readable media according to claim 12, wherein the local counterfeit version of the global component redirects the application request for the component utilizing a DLL/COM Redirection mechanism.

* * * * *